March 5, 1963  J. K. G. SILVEY  3,080,315
PROCESS FOR IMPROVING THE PALATABILITY OF WATER
Original Filed Oct. 4, 1955  6 Sheets-Sheet 1

INVENTOR
JOSEPH K.G. SILVEY
BY
ATTORNEY

INVENTOR
JOSEPH K.G. SILVEY
BY
ATTORNEY

INVENTOR
JOSEPH K.G. SILVEY
BY _______________
ATTORNEY

United States Patent Office 3,080,315
Patented Mar. 5, 1963

3,080,315
PROCESS FOR IMPROVING THE PALATABILITY OF WATER
Joseph K. G. Silvey, Denton, Tex., assignor of one-half to Morrison B. Cunningham, Oklahoma City, Okla.
Continuation of application Ser. No. 538,439, Oct. 4, 1955. This application Nov. 23, 1955, Ser. No. 548,724
16 Claims. (Cl. 210—62)

This invention relates to an improved process and product for improving the palatability of water and is a continuation of application Serial No. 538,439, filed October 4, 1955, now abandoned, which is a continuation-in-part of application Serial No. 430,038, filed May 17, 1954, now abandoned, which in turn is a continuation-in-part of application Serial No. 344,414, filed March 24, 1953, now abandoned.

Naturally occurring tastes and odors in water supplies are attributed to algae, actinomycetes, bacteria, and general organic decomposition. These tastes and odors vary from musty to earthy and may be hay-like, manurial, cucumber, geranium, grassy or otherwise generally offensive. Certain chemical pollutants in water such as aldehydes, ketones, phenols and septic substances also give rise to tastes and odors which render the water unsatisfactory for human consumption.

Taste and odor problems in surface water supplies have been particularly serious during the past ten years. The increase in population and the decrease in underground water supplies make it mandatory that most cities turn to surface sources for their municipal water. Tastes and odors in finished water play havoc with food manufacturing concerns, meat processing organizations, and industries that prepare such items for household use. The solution of the taste and odor problem by an economically feasible process has been long sought after by those responsible for community water supplies throughout the nation.

For many years numerous types of compounds have been employed in an attempt to reduce tastes and odors in raw water. In certain instances, chlorine dioxide has proved useful. Chlorine dioxide is a good oxidizer and theoretically will finally oxidize most of the compounds responsible for tastes and odors in water, but its application is expensive and results not scientifically proved in practice. In other instances, chlorine has partially solved the problem. In most cases, however, there are a sufficient number of aromatic compounds, amines, saturated fatty acids and aldehydes present to make it difficult for chlorine to act effectively and additionally, chlorine normally strengthens some tastes and odors rather than reducing them. It is safe to say that 95% of the taste and odor problems are made worse by the simple addition of chlorine either in a prechlorination or a post-chlorination process. During the last fifteen years activated carbon has been employed. A sufficient amount of activated carbon will reduce odors and tastes to a point where they are unobjectionable for human consumption but activated carbon is expensive and poses problems of handling and storage. Ozone has been used for the removal of tastes and odors and is more effective than chlorine. This gas is generated by high potential electrical circuits which make for expensive equipment and high maintenance costs in producing ozone in quantities necessary for reducing the tastes and odors in municipal water.

Chlorine dioxide gas is the most effective agent that has been tried for the reduction of tastes and odors. It is possible to add an amount to water which can oxidize the tastes and odors and if there is sufficient retention time for the chlorine dioxide to react with all of the available substances or compounds producing the tastes and odors, satisfactory results may be obtained. Since the price of sodium chlorite, the source of this gas, is around eighty cents a pound and since approximately sixteen pounds are required to deliver one p.p.m. chlorine dioxide to water, the application of sufficient amounts of this gas for the reduction of tastes and odors is beyond the financial reach of the average water plant in this country. Sodium chlorite is explosive and relatively unsafe to handle unless the individual operator is especially well trained. Since the chlorite must be reacted with either concentrated chlorine water or sulfuric acid in order to produce chlorine dioxide, this provokes other problems and additional equipment.

As mentioned above, activated carbon has been the most successful agent used up to this time. Fan-type carbon used in adequate concentrations will remove taste and odor compounds but the quantities needed are excessive. There are certain disadvantages in using finely powdered activated carbon. It adds soot and grime to the premises and works hardships on those who tend the loading and unloading of the carbon. Storage has proved a problem in attempting to locate the carbon at some place in the plant where it may be accessible and at the same time not cover the entire area with a layer of fine, black soot. Wet storage in a few of the cities has been successful but has necessitated special installations employing new machinery. Finally, the used carbon must be disposed of. Thus, with the cost of activated carbon more than 7.5 cents per pound, reduction of tastes and odors by this method has proved expensive.

Accordingly, it is a principal object of the present invention to provide an improved process for the treatment of water to improve its palatability by reducing tastes and odors and to provide a product or treating agent for use in reducing tastes and odors in water.

Another object of the present invention is to provide a product or treating agent for reducing tastes and odors in waters which may be produced from readily available raw materials and may be used either as a solid or a solution containing insoluble matter suspended therein, or as a true solution or as a concentrate of either or both solutions.

Still another object is to provide a product or treating agent for reducing tastes and odors in water which may be used in conjunction with a prechlorination treatment to obtain a synergistic effect.

Still another object is to provide a product or treating agent for reducing tastes and odors in water which incorporates an active component and a dispersing component, the two acting in conjunction with each other to produce a synergistic effect.

These and other objects will become more apparent upon considering the following description of the present invention in conjunction with the drawings, in which.

I have discovered that a treating agent or product comprising a component or a mixture of components derivable from leguminous vegetable material, if used in accordance with the process of the invention, will reduce essentially the same taste and odors in water which are reducible by activated carbon. This may be done at a minor fraction of the cost of carbon without offering any of the objectionable problems encountered when using activated carbon.

I have also discovered that a water treating agent or product comprising certain metal complexes, for example chelates, if used in accordance with the process of the invention, will reduce tastes and odors in water.

I have further discovered that a treating agent or product comprising so-called "carriers for oxygen," if used in accordance with the process of the inevntion, will reduce certain tastes and odors in water.

I have further discovered that a treating agent or product comprising salts of certain aliphatic and aromatic polycarboxylic acids, if used in accordance with the process of the invention, will also reduce certain tastes and odors in water.

A discussion of the foregoing treating agents or products and their use in accordance with the process of the invention, together with specific examples illustrating same, appears below.

SUBSTANCES DERIVABLE FROM LEGUMINOUS VEGETABLE MATERIAL

The term "leguminous vegetable materials" is used in the conventional sense and includes vegetable materials such as alfalfa, clover, vetch, peanuts, beans, peas, etc. Alfalfa is the preferred source of leguminous vegetable material for the purposes of the present invention since it is the most important forage crop grown in the United States and, because of its abundance and widespread availability, forms the cheapest source for a raw material constituent of a treating agent of the present invention. Although a hydrated leguminous vegetable material is satisfactory for the purpose of the present invention, a dehydrated leguminous vegetable material is preferred since proper dehydration reduces the shipping weight, handling and storage problems for one of the ractants for forming a treating agent of the present invention without reducing its effectiveness. There are a number of known processes for removal of most of the water content of leguminous vegetable materials without causing disintegration of the active or potentially active components. An example of a typical and satisfactory dehydration technique is found in "Economic Botany." April-June 1949, volume 3, No. 2, pages 170–183.

In order to make the active component or components of the selected leguminous vegetable material available and thereby obtain a treating agent of the present invention, proper proportions of a suitable alkaline material are used. Alkaline materials which will activate the odor reducing constituent or constituents of the selected leguminous vegetable material are, for example, magnesium hydroxide, sodium hydroxide, soda ash, potassium hydroxide, calcium oxide and calcium hydroxide. Of these, hydrated lime or calcium hydroxide is preferred. The reasons for this preference are: (1) it is generally undesirable to add magnesium to water, and, (2) sodium oxide, sodium hydroxide and the corresponding potassium compounds are very strong caustics and exceptionally deliquescent. The preferred alkaline material, namely calcium hydroxide, when dry mixed in proper proportions with the selected leguminous vegetable material to form a product of this invention, does not pick up sufficient water to bring about hydration of the vegetable material and therefore does ont result in premature release of an active component or components.

A preferred composition of the present invention which provides upon addition to proper proportions of water optimum activation of the treating agent content of the leguminous vegetable material comprises an intimate admixture of from 1 to 3 parts by weight of calcium hydroxide for each 10 parts by weight of leguminous-type vegetable material. The same proportions of other alkaline materials such as those named above are satisfactory where addition of magnesium to water or hydration are not objectionable. A preferred composition using alfalfa comprises from 1 to 3 parts by weight of calcium hydroxide for each 10 parts by weight of alfalfa meal which is very finely divided dehydrated alfalfa. The most satisfactory mixture in this range which employs a very high grade lime and a high protein content dehydrated alfalfa meal composed of alfalfa leaf only, is about 4 parts by weight of lime for each 21 parts by weight of alfalfa leaf meal.

The foregoing mixtures may be packaged for sale in any convenient container such as cellophane, paper, or cloth sacks or bags or cardboard or metal containers. The quantity packaged in such containers may conveniently be controlled by the amount of material to be used at one time in a water treatment operation. In addition, this product may be compressed in tablet or pellet form so that a tablet of given weight will treat a specified volume of water. The latter method of packaging is particularly desirable when the purchaser is treating small volumes of water such as bottled water.

Maximum activation of this product of the present invention, i.e., an intimate admixture of from 1 to 3 parts by weight of alkaline material for each 10 parts by weight of leguminous vegetable material is obtained when a sufficient amount of this mixture is added to water to obtain a pH of from 10.4 to 12.5, preferably 11.1 to 11.8. For example, when distilled water is employed, the addition of 5000 p.p.m. of the 4 parts lime, 21 parts alfalfa meal dry mix discussed above will obtain a pH of aproximately 11.6. When using the average raw water of the southwest, the same proportions will result in a pH of 11.8. In most natural water tested from, for example, the Ohio River, the Mississippi River, the Canadian River, the Trinity River, and reservoirs of the same water sheds, the pH obtained using 5000 p.p.m. of this dry mix has been approximately 11.6 to 11.7. Smaller quantities of the dry mix may be employed. For example, when 1000 p.p.m. of this same mixture are added to raw waters such as those mentioned above, a pH of approximately 11.2 will result. Preferably, the aqueous treating agent solutions produced from the foregoing dry mix compositions of the present invention should not be obtained by the addition of less than 0.1% by weight of the dry mix nor more than 0.5% by weight of the dry mix. Between these varied quantities, pH values sufficient to produce maximum activation will be produced in most municipal water.

In order to demonstrate that maximum activation is obtained in aqueous treating agent solutions when using sufficient dry mix to obtain a pH of from 10.4 to 12.5, preferably 11.1 to 11.8, varying amounts of calcium hydroxide were added to 100 milligram samples of dehydrated alfalfa leaf meal placed in 100 milliliters of water. The amounts of caustic added produced a pH range of from 9.5 to 12.5 in steps of 0.1 pH factor making a total of 30 samples. After a contact period of five minutes with vigorous agitation, samples of fluid were centrifuged and read in a Beckman DU Spectophotometer, using a slit width of 0.06 mm. at a wave length of 402 millimicrons. The optical density readings constitute a measure of the quantities of activated products present. The greatest optical density is found between a pH of 10.4 and 12.5 with rapid diminution of optical density at either end of the scale. Within this range, the highest optical densities are obtained when the pH range is from 11.1 to 11.8. Specific tabulated data is as follows:

| pH | Optical Density | Threshold Odor |
|---|---|---|
| 9.5 | .16 | 14 |
| 9.6 | .16 | 14 |
| 9.7 | .16 | 14 |
| 9.8 | .17 | 13 |
| 9.9 | .17 | 13 |
| 10.0 | .17 | 13 |
| 10.1 | .19 | 12 |
| 10.2 | .19 | 12 |
| 10.3 | .19 | 12 |
| 10.4 | .23 | 11 |
| 10.5 | .26 | 11 |
| 10.6 | .26 | 11 |
| 10.7 | .30 | 10 |
| 10.8 | .32 | 10 |
| 10.9 | .34 | 9 |
| 11.0 | .38 | 7 |
| 11.1 | .40 | 5 |
| 11.2 | .44 | 2 |
| 11.3 | .45 | 2 |
| 11.4 | .46 | 2 |
| 11.5 | .46 | 2 |
| 11.6 | .46 | 2 |
| 11.7 | .45 | 3 |
| 11.8 | .44 | 3 |
| 11.9 | .30 | 4 |
| 12.0 | .28 | 4 |
| 12.1 | .26 | 6 |
| 12.2 | .21 | 8 |
| 12.3 | .21 | 10 |
| 12.4 | .21 | 10 |
| 12.5 | .18 | 10 |

In order to be certain that readings of optical density were a true measure of the active substances that reduced tastes and odors a further series of experiments were performed. Aqueous treating agent solutions containing progressively increasing amounts of the preferred composition, i.e., 4 parts by weight of lime for each 21 parts by weight of lime for each 21 parts by weight of dehydrated alfalfa leaf meal, were made up to obtain a pH range of from 9.5 to 12.5 in steps of 0.1 pH factor. After sufficient time for activation, samples of water containing common taste and odor bearing products and having a threshold odor of 30 were treated with each of the made-up activated aqueous treating solutions in an amount equivalent to 5 parts of the dry mix to one million parts of the water treated. The results of the reduction of odor, i.e., the threshold odor numbers of the treated samples, are shown in the column to the right of the optical density readings tabulated above. From these results one may conclude that if the pH of the treating agent of the present invention is maintained between 10.4 and 12.5, preferably 11.1 to 11.8, optimum results are obtained. In the event the pH goes higher or lower, the efficiency of the active compound or compounds drops immediately. The proportion of drop or fall-off does not appear to be capable of mathematical expression.

An attempt was made to use various types of buffering agents in order to obtain a pH between 10.4 and 12.5. The additions of all buffers tried gave significant odor to the water treated and therefore it would appear that conventional buffering agents are not satisfactory.

When the dry mix product composition of the present invention is added to water for the purpose of activating the treating agent, the time and temperature of activation are of importance. For example, optimum results are obtained when a maximum of approximately 2 minutes is allowed. Actually, a minimum time necessary for complete activation at 21° C. is approximately 25 seconds. At 32° C., complete activation will occur in 15 seconds. At 2° C., complete activation requires 2 minutes.

The active treating agent of the present invention derivable from leguminous-type plants by treatment with alkaline material may be used in one of several forms. For example, one form may be defined as the total product of reaction between 10 parts by weight of a leguminous vegetable material and one to three parts by weight of an alkaline material in a volume of water sufficient to yield a pH of from 10.4 to 12.5, preferably 11.1 to 11.8.

A second form of the above treating agent may be defined as the active water-soluble product of reaction between the same materials in the same proportion in water within the same pH range. This second form of treating agent is sometimes referred to hereinafter as supernate. As will be apparent to those skilled in the art, a third form of the above treating agent is one which is intermediate between the first and second forms above, i.e., having at least a portion of the insoluble material removed. Still a fourth form of the above treating agent is what may be defined as a concentrate of the second form of treating agent described above. The methods of obtaining these various forms of treating agent will be discussed more fully hereinafter.

The first form of treating agent, i.e., the total product or substantially the total product of reaction between the constituents of the dry mix products will, as demonstrated by examples presented hereinafter, impart tastes and odors to the water treated when employed in an amount greater than 15 p.p.m. This maximum concentration value, i.e., 15 p.p.m., is based on the dry mix composition as described above. Even when employed in lesser amounts, there is a tendency for the insoluble material of this composition to accumulate at various points in the water treating plant. This accumulation will, when treating relatively warm raw water impart tastes and odors to the water unless the flocculators, filters and other points of accumulation are periodically cleaned. Thus when employing this form of treating agent good plant technique requires the use of not more than 15 p.p.m. of this form of treating agent as well as periodic cleaning of the plant.

The second form of treating agent, i.e., the treating agent containing the active water soluble product of reaction between the leguminous vegetable material and alkaline material in the stated proportions may be produced in the same manner as the first form of treating agent but has the insoluble portion or substantially all of the insoluble portion thereof removed by means, such as settling, centrifuging, filtration, etc. Unlike the first form of treating agent, there is no limit to the amount of this form which may be used except as dictated by economics. Concentrations as high as 100 p.p.m. (based on the weight of dry mix used for making the treating agent) of this form of treating agent have been employed for improving the platability of water without imparting objectionable tastes and odors. The raw water treated had initial threshold odors as high as 800. When treating a sample of water having a threshold odor of 800, 90 p.p.m. of this form of treating agent reduced the threshold odor to 10. Use of additional amounts of this form of treating agent did not reduce the threshold odor lower than 10 nor did it impart additional odors or tastes to the water treated. Hence where cost is a consideration, a determination of the optimum amount of this form of treating agent should be made. Using more than the optimum amount merely increases the cost of the treatment without producing improved results.

The third form of treating agent mentioned above, i.e., a treating agent intermediate in form between the first and second is also of value since separation of the more easily settled solids renders this form of treating agent substantially equivalent to the second form. That is to say, there appears to be no upper limit to the amount that may be used insofar as imparting additional tastes and odors to the water is concerned. Such a form of treating agent may be represented, for example by the second form of treating agent containing suspended colloidal particles of the insoluble material.

The fourth form of treating agent, namely a concentrate of the actual active constituent or constituents of the total composition responsibe for the reduction of tastes and odors, may be obtained by a number of different methods. One method of isolation employed is a process known as hydro-chromatographic adsorption.

Hydro-chromatographic adsorption is a method of adsorbing the different constituents of a mixture present in an aqueous solution by the use of a solid adsorbent material. If the second form of treating agent, namely the water soluble product of the stated reaction, is allowed to ascend by capillary action a column packed with an adsorbing solid, the more readily adsorbed solutes are adsorbed in the lower part of the column while the less readily adsorbed solutes are adsorbed in the upper part of the column. As a result, successive layers containing different solutes of mixtures of solutes are formed from the top to the bottom of the column. As will be demonstrated by examples appearing hereinafter, the constituent or constituents of the second form of treating agent which are most active in reducing tastes and odors are concentrated in a central zone or area of the chromatograph. When viewing the material containing adsorbed solute through the walls of the glass column, the central zone may be distinguished by the fact that it lies at substantially the mid point of the high of the column and possesses a distinguishing color. If the adsorbent together with the adsorbed solute is pushed out of the column and viewed under ultra violet light, the central zone will exhibit a fluorescence of greater intensity than the zones on either side thereof. Comparison of the activity of the adsorbed products of the various zones by treatment of a standard test water shows the ability of the adsorbed product of the central zone to reduce tastes and odors to a lower value than may be obtained by using the adsorbed product of the other zones.

A second method of isolation of a concentrate of the active constituent or constituents of the total composition is by dehydration of the second form of treating agent. By this method, the second form of treating agent is dehydrated to yield a dry powder, preferably under a partial vacuum such as to allow boiling at 60° C., but a temperature as high as 100° C. is satisfactory. As will be demonstrated by examples appearing hereinafter, this dry powder represents an active product or products present in the second form of treating agent and is most active in reducing tastes and odors.

A third method of isolation of a concentrate containing an active constituent or constituents of the total composition which has proved very effective in reducing tastes and odors in water may be described briefly as follows: The second form of treating agent is first acidified to a low pH. A heavy precipitate is formed which is separated from the remaining liquid and dried, preferably under reduced pressure at 60° C. As will be demonstrated by examples hereinafter, this dehydrated precipitate likewise represents an active product or products in the second form of treating agent and is likewise most effective in reducing tastes and odors in water. Extraction techniques may also be used in recovering concentrates under this method. For example, under certain conditions the active product becomes more soluble in ethyl ether, chloroform, etc., after the foregoing acidification step and may be removed from the aqueous soluiton by a subsequent extraction step with organic solvents. Active solid material may be recovered by vacuum distillation or by flashing off the organic extraction solvent, yielding a dry powder.

For practical reasons, the fourth form of treating agent is preferred. It is apparent that if large quantities of treating agent are to be used in a water plant, it would be advantageous to prepare a concentrate from the leguminous vegetable material and place it on the market in package form so as to reduce shipping cost as well as handling and storage expenses. The use of dehydrated concentrates is desirable for reasons other than the fact that a small quantity of concentrate can be used to treat a relatively large volume of water. For example, tests indicate that either of the dehydrated types of concentrate appears to be stable in the dry form, and even when placed in solution the loss of activity is very slow. As a specific example, dehydrated concentrate was used in concentrations of 20 p.p.m. (based on the dry mix used in its preparation) to reduce the threshold odor value of water from 100 to 2. This test was repeated five months later using the same dehydrated concentrate which had remained at room temperature during this period, and again 20 p.p.m. of the concentrate (based on the dry mix used in its preparation) reduced the threshold odor value of water from 100 to 2. A solution of concentrate which was allowed to stand for two weeks at room temperature was used in concentrations of 20 p.p.m. (based on the dry mix used in its preparation) to treat water having a threshold value of 100. This solution reduced the threshold odor to 4, thus indicating that the loss of activity is very slow.

Figure 1:
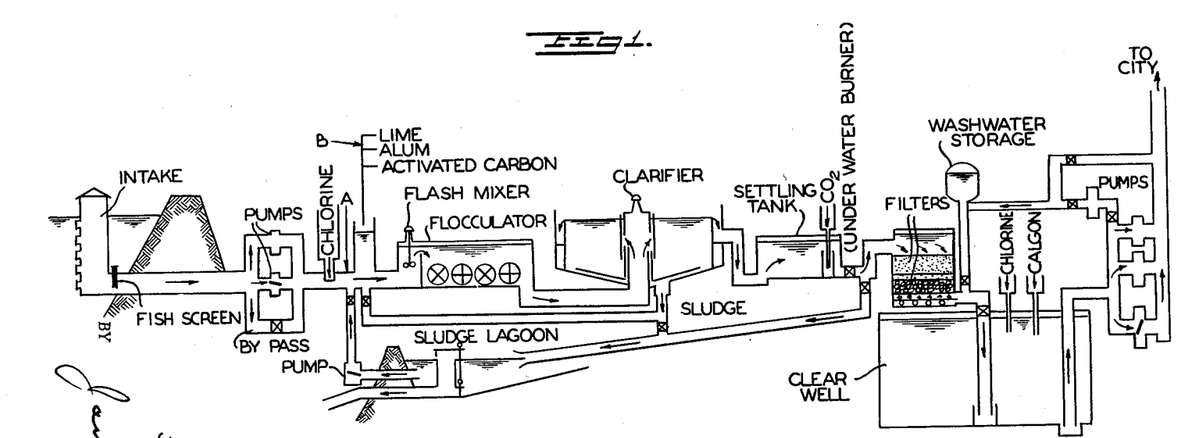
FIGURE 1 is a flow diagram of a typical water treatment plant.

For the purpose of illustrating the process of the present invention as applied to a conventional water purification plant, reference is now made to FIG. 1 which diagrammatically illustrates a conventional water filtration plant. No specific description of this plant is necessary since it is a typical installation similar to those used in many places in the United States and is therefore familiar to those skilled in the art.

When the dry mix product of the present invention is activated by addition of the same to water in an amount sufficient to obtain a pH of from 10.4 to 12.5, preferably 11.1 to 11.8, the resulting treating solution should be added as far above the flash mixer as possible. This is true regardless of the forms of treating agent employed. Since prechlorination practice is preferable in some instances in accordance with the present invention, the addition of the properly activated product of the present invention is desirably made just after the prechlorination step, i.e., at the point indicated by reference character A. It is possible that the activated product of the present invention could be added to the flocculators or the clarifiers. Preferred results, however, are obtained when this addition is made earlier in the treating process. In the event that a particular water purification plant has only primary sedimentation without the application of chemicals, then the product of the present invention may be added at the point of primary sedimentation or if possible, on the raw water line, followed preferably by chlorination.

Although the description of the present invention to this point has concerned itself with treating agents of various forms derived from a dry mix product, it is possible to operate the process of the present invention by adding the constituents of the dry mix product separately and in the same proportions. In the event that such addition is desirable, the leguminous-type vegetable material may be added by means of a dry hopper and fed into the lime line just below, above, or in the slaker so the lime will mix with the leguminous-type vegetable material and obtain proper activation prior to entry of the resulting treating solution into the water line. Point B as illustrated in FIG. 1 indicates a point of addition of the leguminous-type vegetable material to the lime line. In carrying out the process of the present invention by this method of addition, it is important that the same ratio of lime to leguminous-type vegetable material be maintained and that the pH of the resulting aqueous treating solution be controlled by proper addition of these materials so as to obtain a pH range of from 10.4 to 12.5. If the form of treating agent employed is the second form of treating agent, removal of the insoluble material by appropriate means, such as settling should occur prior to the addition of other treating agents, such as alum or activated carbon.

As will be demonstrated by data presented hereinafter, prechlorination in concentrations from 1 to 10 p.p.m. with subsequent addition of the activated treating agents of the present invention obtains a threshold odor even lower than that obtained with the use of a treating agent of the present invention alone.

Although prechlorination practice is sometimes desirable, it has been found that post-chlorination practice alone after the addition of the activated product of the present invention gives relatively poor results. A combination of prechlorination and post-chlorination with an intermediate treatment with an activated product of the present invention gives results which are even better than prechlorination followed only by the addition of the activated product of the present invention.

The discussion of the invention thus far has been concerned with treating agents or products derivable from properly activated leguminous vegetable material. The exact chemical composition of these treatings agents or products is not known, but in all probability they each contain a large number of different substances with one or more of the substances being active in reducing tastes and odors in water. There appears to be support for the theory that the various active substances in the treating agents derivable from leguminous vegetable material react differently and/or on different taste and odor bearing compounds in reducing tastes and odors in water.

I have also discovered that certain classes of known chemical substances are effective in reducing tastes and odors in water when used as treating agents or products in accordance with the process of the invention. There appears to be support for the theory that the various classes of such known chemical substances react differently, or by different reactions mechanisms, and/or on different types of taste and odor bearing compounds in reducing tastes and odors in water. Each class of these known substances and its use are discussed hereinafter, and specific examples are presented illustrating the effectiveness of each class.

TREATING AGENTS AND PRODUCTS DERIVED FROM KNOWN CHEMICAL SUBSTANCES

One class of the known chemical substances I have discovered to be effective in reducing tastes and odors initially present in raw water when used in accordance with the process of the invention are the metal complexes. The term metal complex is used in this specification and in the claims as being inclusive of the metal chelates since metal chelates may be thought of as being metal complexes having a ring structure.

The metal chelates may be considered to be a distinct class of compounds possessing certain chemical and physical properties which are fundamentally different from other simple metal compounds or organo-metallic compounds. It is not deemed necessary to discuss the metal complexes and chelates at great length since textbooks are readily available on the subject. Reference to a well known text entitled "Chemistry of the Metal Chelate Compounds" by Martell and Calvin is deemed sufficient, taken with the present disclosure, to enable those skilled in the art to practice the invention described herein. However it may be stated that a metal chelate is formed when an electron accepting metal ion combines with an electron-donating compound having two or more donor atoms or groups, arranged in such a manner as to form one or more rings, and with the metal being a member of the ring structure thus formed. The electron-donating compound is usually referred to as a chelating agent.

A number of different types of chelating agents are known, among the more common being aromatic and aliphatic amines, aromatic and aliphatic polycarboxylic acids, amino acids and peptides, hydroxy acids, dihydroxy azo dyes, molecularly dehydrated phosphates, and beta-diketones. It will be noted that the donor atoms, i.e., the atoms which undergo combination with the metal ions to form a ring structure, in each type of chelating agent are restricted to non-metallic elements of groups 5 and 6, with nitrogen, oxygen and sulphur being the more common donor atoms. The electron-pair bonds between the electron-accepting metal and the electron-donating or chelating agent may vary from essentially ionic to covalent depending upon the particular metals and donor atoms involved.

Nearly all metals will combine with a suitable chelating agent to form metal chelates, the metal chelates thus formed exhibiting varying degress of effectiveness when used in accordance with the present invention. Some of the more active metal chelates effective for the purposes of this invention are chelates of copper, iron, cobalt, nickel and manganese, of which the iron chelates are usually preferred. Some of the preferred chelating agents are polycarboxylic acids, hydroxy acids, aromatic and aliphatic amines, and dihydroxy azo dyes. In the inorganic field, a satisfactory class of chelating agents are the molecularly dehydrated phosphates. While the foregoing chelating agents and preferred metals may combine to produce presently preferred and highly effective metal chelates for the purpose of the invention, this is not to be taken as excluding other chelating agents or other metals which will likewise combine to produce suitable metal chelates useful as water treating agents in accordance with the process of the invention.

A treating agent comprising metal chelates may be prepared prior to addition of other conventional water treating agents and added to water as the metal chelate.

Treating agents comprising metal chelates will reduce the threshold odor value of water treated therewith to lower values than otherwise possible. The quantity of chelate necessary to effect a desired reduction in tastes and odors in water is very small, usually varying between less than one p.p.m. to several p.p.m. by weight of the water treated. Actually in practice the upper limit is generally economic in nature. It will be demonstrated by data appearing hereinafter in the examples that certain metal chelates are most effective treating agents for reducing tastes and odors initially present in water when used in accordance with the process of the invention. The chelates are particularly effective in reducing tastes and odors which may be described as musty, marshy, haylike, grassy or manurial.

A second class of known chemical substances I have discovered to be effective in reducing tastes and odors in water when used in accordance with the process of the invention are the so-called "carriers for oxygen."

The term "carriers for oxygen" is intended to include those compounds having the "oxygen use" properties of the quinones. The quinones, for example, apparently have the property of changing from a hydroquinone or quinide to a quinone, and then back to a hydroquinone, depending upon the available oxygen and/or chlorine present in odor and taste bearing water treated by the process of the invention, with at least one of the foregoing substances exhibiting "oxygen use" properties. For the purpose of the specification and claims, the term "carriers for oxygen" includes those compounds capable of undergoing similar changes in molecular structure and which exhibit oxygen use properties when in the presence of available oxygen and/or chlorine, and those compounds having similar oxygen use properties. In addition to the hydroquinone-quinone group of compounds above referred to, there may be mentioned the nitro-nitroso and the nitroso-oxime groups of compounds. The quantity of the of the "carrier for oxygen" necessary to effect a desired reduction in tastes and odors in water usually varies between less than one p.p.m. to several p.p.m. by weight of the water treated, the upper limit in most instances being economic in nature.

As will be illustrated by examples appearing hereinafter, the "carriers for oxygen" are very effective organic compounds for reducing certain tastes and odors initially present in water supplies. The "carriers for oxygen" are particularly effective against earthy, rotten wood, and rotten hay type odors and for this reason it is desirable in some instances to compound a treating agent for water comprising a carrier for oxygen and one or more of other classes of treating agents described herein. For example, a treating agent composition comprising a carrier for oxygen and a metal chelate may be demonstrated to be more effective in removing tastes and odors from waters in some instances than when either is used alone.

I have discovered that salts of aromatic and aliphatic polycarboxylic acids and salts of hydroxy acids, are also effective water treating agents. It will be apparent from the examples hereinafter that sodium or calcium salts of polycarboxylic acids such as phthalic and succinic acids may be added directly to water, preferably after prechlorination, to effect lower threshold odor values in the finished water. Such substances are particularly effective on tastes and odors which may be described as earthy and rotten wood. The quantity of such salts necessary to effect a desired reduction in tastes and odors in water may vary from less than one p.p.m. to several p.p.m. by weight of the water treated, the upper limit usually being economic in nature. Calcium phthalate and sodium salicylate have been found to be particularly effective as water treating agents.

It is desirable in many instances to add the known chemical substances described herein to odor and taste bearing water along with relatively large quantities of a finely divided siliceous mineral, such as for example, diatomaceous earth, bentonite, Columbia clay, kaolin, etc. These siliceous minerals have the ability to aid in the adsorption and removal of at least a portion of the odoriferous material content of the treated water. Thus a water treating composition comprising a minor proportion of one or more of the foregoing known chemical substances and a major proportion of a siliceous mineral will give even better results than these chemical substances alone and is preferred in many instances. The presently preferred siliceous minerals are bentonite and/or Columbia clay. Specific examples of water treating compositions and examples illustrating their use will appear hereinafter.

Improved results may also be obtained from a given quantity of treating agent, regardless of the type or form of treating agent employed, by the addition of the treating agent to the water in one or more portions. For example, a portion of the treating agent may be added at the point indicated by A in FIG. 1 of the drawing, and then one or more additional portions may be added thereafter at any suitable point in the diagram, but preferably ahead of the settling tank. By splitting the feed of treating agent in this manner, a smaller quantity of treating agent is required to effect low threshold odor values and thus the process is even more economical.

When using a water treating agent derived from one or more of the known substances described herein, it is desirable in most instances to first prechlorinate a raw water and then add the treating agent. This step may then be followed by a suitable flocculation agent such as alum or ferri-flock, and finally sedimentation, coagulation and filtration. Post-chlorination may also be desirable in some instances. The time element between the steps of adding chlorine in the prechlorination step, addition of treating agent, and addition of flocculating agent does not appear to be of great importance in most instances. For example, the prechlorination step, addition of treating agent, and addition of flocculating agent can usually be made one directly after the other if desired without affecting the results in odor reduction.

Prechlorination may or may not be necessary, depending upon the type or types of odors present in the water and the amount of oxygen dissolved in the water. For example, in water saturated with oxygen and having only an earthy odor, prechlorination may not be desirable. However, if musty, hay-like or putrescible odors are present, prechlorination as well as possibly postchlorination may be desirable. Most surface waters usually contain one or more such odors and thus prechlorination is normally necessary to obtain a lower reduction in tastes and odors.

The chlorine residual is of importance in instances where prechlorination is desirable. It will be demonstrated by data appearing hereinafter in the examples, that the treating agent is more effective and preferred results may be obtained when the chlorine residual is about .5 p.p.m. or higher. In practice it is not always possible or even desirable to obtain such high chlorine residuals, and in all instances it has been found that excellent results in taste and odor reduction may be obtained at lower chlorine residuals.

The flocculation step in the process of the invention may be effected by the addition of a suitable flocculation agent to the water, such as by the addition of either alum or ferri-flock. A quantity of a suitable siliceous mineral may also be added and preferably a clay having an ability to act somewhat like a polyelectrolyte and aid in coagulation of the flock and adsorption of odoriferous material, such as bentonite. The suspended flock and/or clay thus produced appears to adsorb a large percentage of taste and odor bearing compounds from the water. The adsorbed compounds may then be removed from the water together with the suspended flock or clay by either coagulation and sedimentation or filtration. It is apparent that removal of both the flock and clay from suspension in the water is necessary for best results in taste and odor removal, since the adsorbed odor bearing compounds tend to be eluted to some extent upon warming the water and thus may be detected. The combination of the treating agent with the siliceous materials described above appears therefore to have a synergistic effect in reducing both tastes and odors in the water.

The mechanism by which the various water treating agents described herein reduce tastes and odors initially present in water, whether derived from properly activated leguminous vegetable material or from known chemical substances, is not fully understood. However, it is presently believed that the most probable mechanism for the various classes of known treating agents may be stated as follows: Referring first to the metal chelates, it is thought that when a metal such as iron is chelated it does not remain in an ionized state. The iron is believed to be securely and perhaps permanently held in the organic ring structure of the chelate. When the iron chelate is placed in the water, on being exposed to oxygen and/or chlorine, the chelated iron is thought to be oxidized from the ferrous to ferric valence state. If the iron chelate in the oxidized condition is in the presence of taste and odor bearing compounds responsible for odors and tastes which may be described as musty, marshy, hay-like, grassy, or manurial, the chelated iron is probably reduced from the ferric to the ferrous valence state while the odor and taste bearing compounds are probably oxidized, partially oxidized, or otherwise have their chemical structure modified in such a manner as to enable the flock and/or clay to more completely adsorb the odoriferous material. The mechanism thus postulated may be thought of as an oscillating chemical reaction, so as when more oxygen and/or chlorine are available in the water, the iron content of the chelate is oxidized from the ferrous back to the ferric valence state, which then reacts with more of the odor and taste bearing material. This process is continued until all the odor and taste bearing material is rendered innocuous or until the oxygen and/or chlorine is used up. The second class of known chemical substances effective as water treating agents, the carriers for oxygen, seem to have a different mechanism. The quinones, for example, apparently have the property of changing from a hydroquinone or perhaps a quinide to a quinone and then back to a hydroquinone, depending upon the available oxygen and/or chlorine present, and the type of odor and taste bearing compound present in water treated by the process of the invention. This class of known chemical substances are particularly effective against odor and taste bearing compounds which give rise to odors and tastes in water which may be described as earthy, rotten wood or rotten hay. It appears that the hydroquinone or a quinide is changed to a quinone in the presence of oxygen and/or chlorine and one of these forms, being a carrier for oxygen, aids in the oxidation of the odor and taste bearing compounds resulting in the foregoing types of odors and tastes, and is itself changed back into a hydroquinone. The hydroquinone may then be changed back into a quinone by additional oxygen and/or chlorine, which then may react with more taste and odor bearing compound. This process is believed to be repeated until all the odor and taste bearing compounds are destroyed or until insufficient oxygen and/or chlorine is present. The salts of polycarboxylic acids, such as the phthalates, are particularly excellent treating agents for water bearing tastes and odors which may be described as earthy or rotten wood. However, it is not possible at the present time to present a possible reaction mechanism for these substances which would receive scientific support.

The following examples illustrate the preparation of the various types and forms of treating agents or products hereinbefore described, and the process of the invention for reducing tastes and odors in water supplies. However, it is to be understood that the specific examples herein are for purposes of illustration only, and are not to be construed as limiting to the scope of the invention which is set forth in the appended claims.

*Example I*

Experimental runs of the process of the present invention were made in an actual plant installation similar to the installation illustrated in FIGURE 1. This plant had been treating raw water having an average threshold odor of 8 with activated carbon. By the use of 50 pounds of activated carbon per million gallons of water treated, the threshold odor could be reduced to 2. A water having such a threshold odor has a slight taint of its original odor when heated but is odorless when cold or at supply temperature.

In order to make a plant installation in accordance with the present invention, it was necessary to use the original dry carbon feeder to hold and distribute the alfalfa leaf meal which was employed. The dry feeder, which is a hopper type machine, was set at the lowest possible steady feed which was five pounds of alfalfa leaf meal per million gallons of water. As the alfalfa leaf meal was fed through the grating, it was picked up by the water and carried to the lime mixer just below the slaker. The pH of the resultant solution was approximately 11.6. The temperature of the lime water was 70° F. The reaction of the lime and alfalfa leaf meal brought about an almost immediate activation of a component or components thereof. The reactions of the activated components of the alfalfa for the removal of taste and odor compounds appeared to consume a time of from three to five minutes. The water from the flash mixer moved into primary sedimentation, from there into the clarifier, thence into the secondary sedimentation, and then to the filters. Threshold odor runs on water coming from the bottom of the filters showed it to be devoid of taste and odor at 140° F. temperature. The cost of water treatment was only 25% of that involved in the previously used activated carbon treatment.

The following examples illustrate the treatment of a number of water samples in accordance with the process of the present invention. FIGURES 2 through 17 of the drawings illustrate the tabulated data obtained in Examples II through XVII, repectively. Each of Examples II through XII and XIV through XVII are based on laboratory results and not on pilot plant operations or actual installations. Routinely, however, laboratory results agree with either pilot plant or actual plant practice. Thus, it is felt that the taste and odor of the finished water in an actual plant operation would be as low as shown in these examples. Example XIII is based on actual plant operation using a preferred form of treating agent of the present invention.

*Example II*

Figure 2:
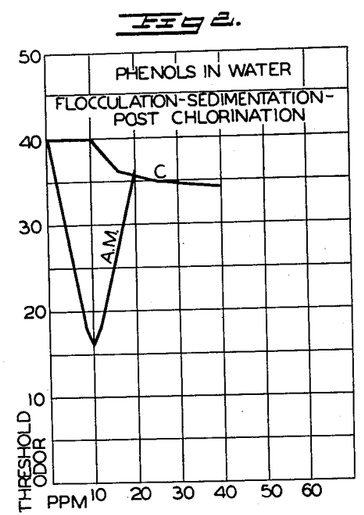
FIGURES 2 through 17 graphically illustrate the results of treating of raw water with a product or treating agent of the present invention or in accordance with the process of the present invention.

Phenols were added to distilled water so as to produce a threshold odor of 40. Samples were treated using the addition of activated alfalfa leaf meal and activated carbon to different samples followed by flocculation, sedimentation, and post-chlorination. The alfalfa leaf meal was activated by the addition of a dry mixture of four parts by weight of calcium hydroxide and 21 parts by weight of alfalfa leaf meal to distilled water in amounts sufficient to obtain a pH of 11.6. The graphical analysis of FIGURE 2 refers to p.p.m. In the case of activated alfalfa leaf meal, the amount of material added to obtain a lower threshold odor number is based on the dry weight of the mixture of alfalfa leaf meal and calcium hydroxide and not on the weight of aqueous solution containing the same in activated form. Reference in the following examples to "activated alfalfa leaf meal" means the dry weight of a mixture of calcium hydroxide and alfalfa leaf meal after activation by addition to water to obtain a pH of from 10.4 to 12.5. The post-chlorination treatment used as indicated in FIGURE 2 was 0.5 p.p.m.

In the figures, "A.M." means activated alfalfa meal and "C" means activated carbon.

As indicated graphically the lowest threshold odor obtained when using the activated alfalfa leaf meal was 21 at a concentration of 10 p.p.m. Activated carbon in concentrations of 40 p.p.m. reduced the threshold odor slightly below 35. This clearly indicates that use of activated leguminous vegetable matter or activated carbon with post-chlorination alone, is not successful as a practice when phenols are present in water.

*Example III*

Figure 3:
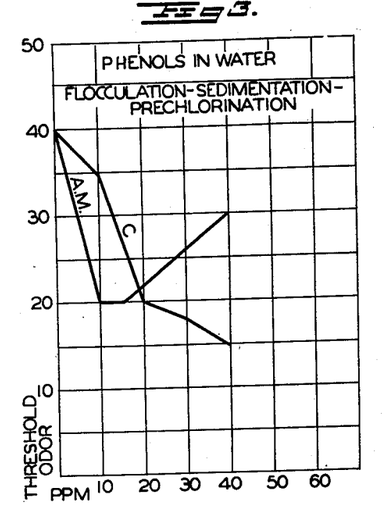

Additional samples, i.e. of the same make-up as those used in Example II, of phenols in water having a threshold odor of 40 were first treated by prechlorination and then by the addition of either activated alfalfa leaf meal or activated carbon. Thereafter the thus treated water was subjected to flocculation and sedimentation. The results as illustrated in FIGURE 3 show that a concentration of between 10 and 12 p.p.m. of activated alfalfa leaf meal reduces the threshold odor to 20 whereas activated carbon in concentrations of 40 p.p.m. reduces the threshold odor to 15. This clearly demonstrates that if activated carbon is used in sufficiently high concentrations, it is superior to activated alfalfa leaf meal for the removal of tastes and odors due to the presence of phenols. However, neither of these products is highly effective when phenols are present in water. Phenols, however, are the only compounds that have been found to be difficult to handle with the process of the present invention. The best method of handling taste and odors arising from the presence of phenols is to use a treatment with activated alfalfa leaf meal or other dehydrated leguminous vegetable matter following prechlorination, followed in turn by a treatment with activated carbon, and finally post-chlorination. This treatment of water polluted with phenols results in good water produced much less expensively than using carbon alone.

*Example IV*

A common cause of tastes and odors in large streams and rivers is the inflow of industrial plant waste such as effluent from formaldehyde, alcohol and similar industrial plant waste. In order to test the effectiveness of the present invention, water samples having an odor similar to those found in sections of the Trinity River in Texas, parts of the Mississippi River, the Ohio River, and streams in northeastern Oklahoma were produced.

Figure 4:
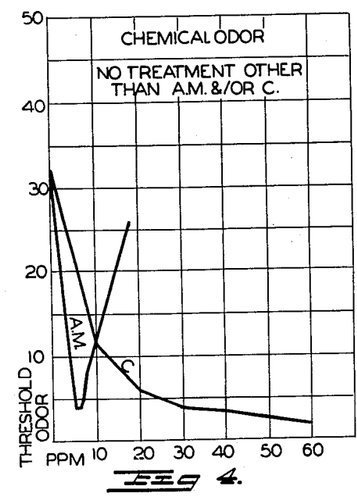

FIGURE 4 of the drawings shows the results obtained upon the addition of activated alfalfa leaf meal to one series of samples and activated carbon to another series of samples having a threshold odor of 34. No other treatment was used in this example. Activated alfalfa leaf meal in a concentration of from 6 to 7 p.p.m. reduced the threshold odor number to 4 whereas carbon in concentrations of 60 p.p.m. reduced the threshold odor number to 2. A threshold odor number of this type amounting to 4 or 5 is not noticeable in domestic water.

*Example V*

Figure 5:
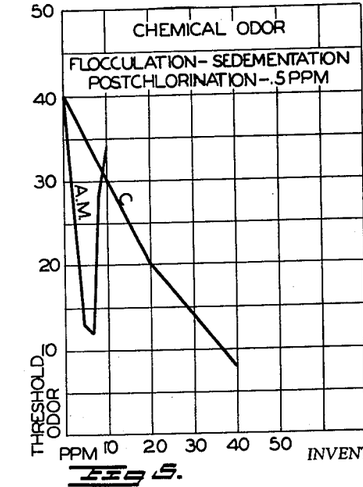

Samples of water of the same make-up as those used in Example IV above but with a threshold odor of 40 were treated with the addition of either activated alfalfa leaf meal or activated carbon followed by flocculation, sedimentation, and post-chlorination. As illustrated in FIGURE 5, a concentration of 6 p.p.m. activated alfalfa leaf meal reduces the threshold odor to 12. 40 p.p.m. of activated carbon reduces the threshold odor to 8. Neither of these treatments is particularly effective as compared with results obtained in Example VI.

*Example VI*

Figure 6:
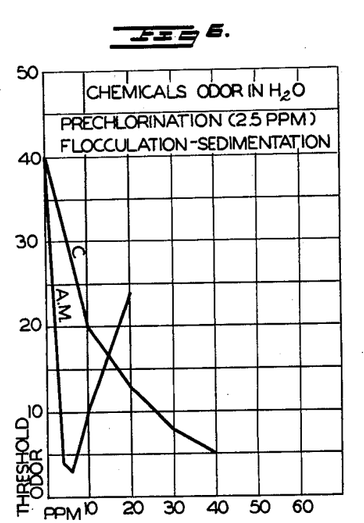

Samples of water of the same make-up as those employed in Example V were prechlorinated, treated with activated carbon or activated alfalfa leaf meal and subsequently subjected to flocculation, sedimentation, and post-chlorination. The results as illustrated in FIGURE 6 show that the addition of activated alfalfa leaf meal at a concentration between 4 and 6 p.p.m. reduced the threshold odor from 40 to 3. Activated carbon at a concentration of 40 p.p.m. reduced the odor to 5.

*Example VII*

Figure 7:
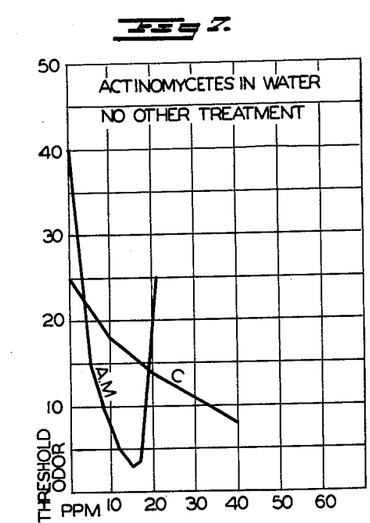

Actinomycetes and/or algae and their decomposition compounds produce a high percentage of the tastes and odors found in the surface waters of North America. Since actinomycete and algae and their decomposition odors are variable, 80 different strains of actinomycetes and algae were reared in culture so as to have a representative sample of all of the odors attributable to actinomycetes and algae. The byproducts of these strains of actinomycetes and algae were added to water in an amount sufficient to obtain a threshold odor of 40. In FIGURE 7 of the drawings, it will be observed that when activated alfalfa leaf meal was added to certain samples in concentrations of 15 p.p.m., the threshold odor was reduced to 3. In the series of experiments shown in FIGURE 7, I could not use water with activated carbon having a threshold odor of 40 since insufficient odor reduction was observed even at 60 p.p.m. so that it was necessary to substitute samples with threshold odors of 25. In that instance, 40 p.p.m. were required to lower the odor to a threshold number of 8 demonstrating that the activated alfalfa leaf meal is much superior to activated carbon for odors and tastes due to actinomycetes, algae and their decomposition by-products.

*Example VIII*

Figure 8:
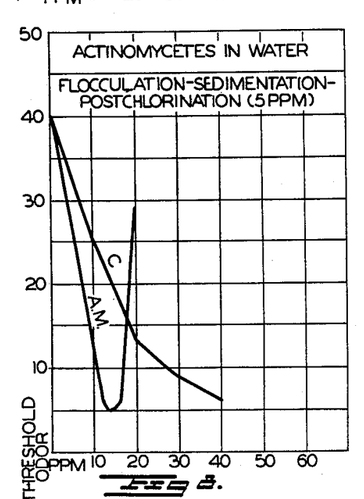

A number of samples of water of the same make-up as used in Example VII were treated with activated alfalfa leaf meal or activated carbon and were then subjected to flocculation, sedimentation, and post-chlorination. In FIGURE 8 of the drawings, it will be observed that the threshold odor in the case of activated alfalfa leaf meal at a concentration of 12 p.p.m. was reduced to 5; whereas, in the case of activated carbon at a concentration of 40 p.p.m. the threshold odor was reduced to 6. Post-chlorination alone is therefore of no real value in the case of treating water with activated alfalfa leaf meal.

*Example IX*

Figure 9:
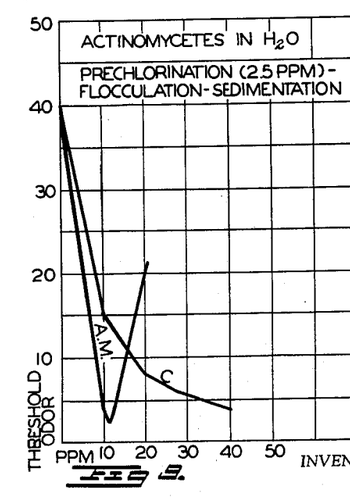

In this example, using samples of water of the same make-up as used in Examples VII and VIII and subjecting them to prechlorination in an amount of 2.5 p.p.m., treatment with activated alfalfa leaf meal or activated carbon, followed by flocculation, sedimentation and post-chlorination, a concentration of between 10 and 12 p.p.m of activated alfalfa leaf meal removed most of the odor from the water, the lowest threshold odor being approximately two and one-half. If sufficient carbon had been used to lower the threshold odor to two and one-half rather than to 4, a concentration of 60 p.p.m. would have been necessary.

*Example X*

Figure 10:
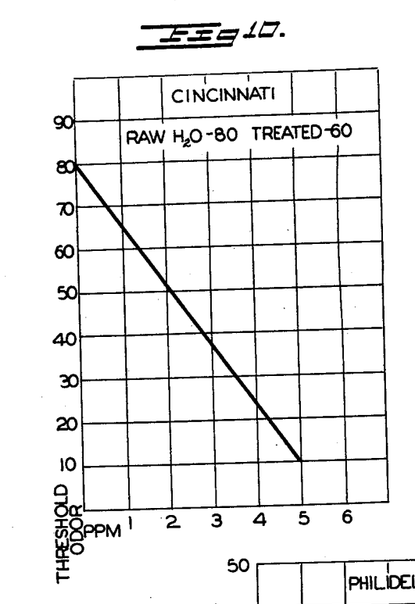
Figure 11:
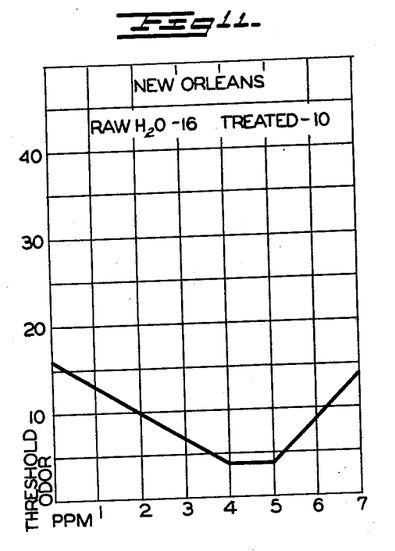
Figure 12:
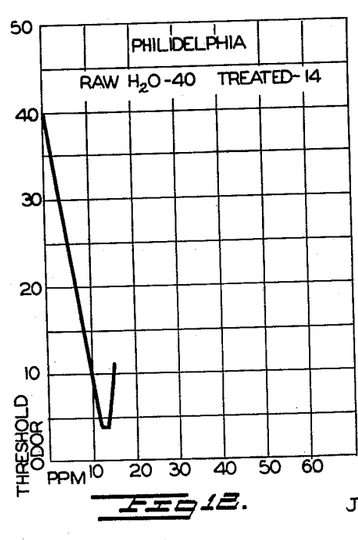

A sample of raw water from the Ohio River, in the vicinity of Cincinnati, was obtained. This raw water has a threshold odor of 80. Treatment by the existing practice used in the water treating plant near Cincinnati reduces the threshold odor to 60. As shown in FIGURE 10, activated alfalfa leaf meal in concentrations of 5 p.p.m. reduced the threshold odor of the raw water to 10.

*Example XI*

A sample of water was obtained from New Orleans. The raw water from the New Orleans area had a threshold odor of 16 and the conventionally treated water had a threshold odor of 10. By the addition of between 4 and 5 p.p.m. of activated alfalfa leaf meal to the raw water, the threshold odor of 16 was reduced to 4.

*Example XII*

Samples of water were secured from Philadelphia. The raw water has a threshold odor of 40 and the conventionally treated water, a threshold odor of 14. By the addition of 12 p.p.m. of activated alfalfa leaf meal, the raw water threshold odor of 40 was reduced to 4.

There has been a previous brief mention of the amount of treating agent containing the total product of reaction which may be added to the raw water without imparting tastes and odors. The fact that there is an upper limit of the amount of treating agent in this form which may be added to the water in order to reduce the odors to a minimum is well demonstrated by FIGURES 2 through 12. Thus, in each type of water treated, addition of a certain amount of the total activated leguminous type vegetable material will result in the reduction of the raw water threshold odor to a minimum value. Increasing the concentration of the treating material added beyond this point causes additional odors and tastes not formerly found in the water prior to treatment. In all cases when using this form of treating agent, the concentration of the activated treating material should not exceed 15 p.p.m. if optimum results are to be obtained.

*Example XIII*

Figure 13:
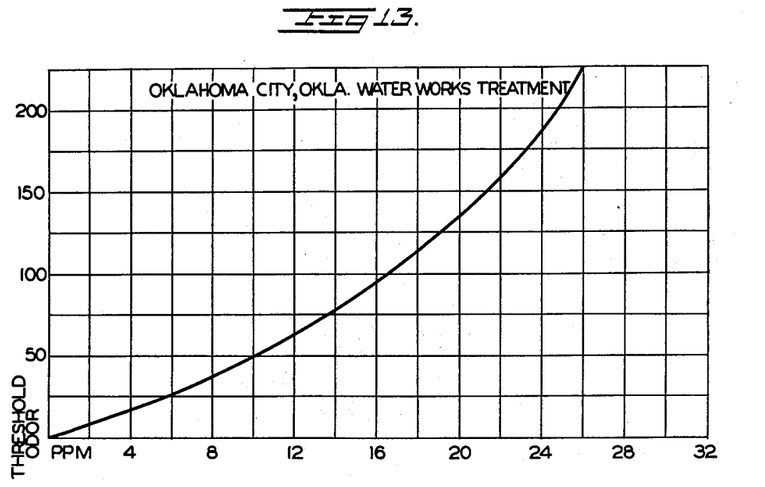

The data plotted graphically in FIGURE 13 was obtained from actual water plant practice at the Overholser plant, Oklahoma City Water Works. The treating agent employed was the water soluble activated product of reaction between 21 parts by weight of dehydrated alfalfa leaf meal and 4 parts by weight of lime. After addition of the dry mix to sufficient water to obtain a pH of 11.6, insoluble material was allowed to settle and the treating agent recovered by decanting.

During the time the plotted data was obtained, the threshold odors of the raw water varied from 7 to 200. The particular water plant in which these tests were carried out is similar to that illustrated in FIGURE 1 of the drawings. The treating agent was fed in split fashion. That is to say, a portion of the treating agent was fed to the chlorinated raw water, a portion was fed to the clarifier, and the remainder was fed to the filter surfaces. Although the graphical plot is extrapolated to a threshold odor of zero, it is not intended to convey that all water may be rendered absolutely odorless. Instead the graph is to be used by a plant operator for determining the amount of treating agent that should be employed for treating raw water having a specific threshold odor in order to obtain optimum results. Thus, for a raw water having a threshold odor of 100, the optimum amount of treating agent would be approximately 17 p.p.m. (dry mix (see Example II). Use of this amount of treating agent will actually reduce the threshold odor of the water to a value of approximately 3 or 4.

*Example XIV*

Figure 14:
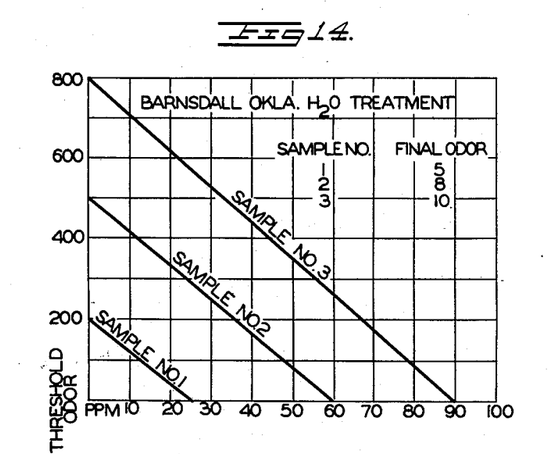

FIGURE 14 of the drawings illustrates laboratory data obtained when treating water obtained from the vicinity of Barnsdall, Oklahoma. Three different water samples were treated; the first had an initial threshold odor of 200, the second had an initial threshold odor of 500 plus, and the third had an initial threshold odor of approximately 800. Treatment of the raw water of a threshold odor of 200 with 25 p.p.m. of the treating agent of Example XIII above reduced the threshold odor to 5. Treatment of the 500 plus threshold odor raw water with 60 p.p.m. of the same treating agent gave a final odor of 8. Treatment of the 800 threshold odor water with 90 p.p.m. of the same treating agent produced a finished water with a threshold odor of 10. The use of additional amounts of this treating agent on each of these raw waters did not improve the final results nor impart additional odors.

*Example XV*

Figure 15:
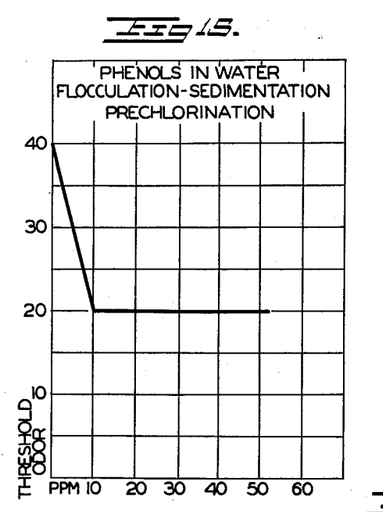

The results of this example are graphically illustrated in FIGURE 15 of the drawings. The raw water treated and the method of treatment were identical with those employed in Example III. The treating agent employed, however, was the treating agent employed in Example XIII. As shown in FIGURE 15 approximately 10 p.p.m. of this treating agent lowered the threshold odor to 20. Additional amounts up to 50 p.p.m. did not contribute or remove odors from the samples.

*Example XVI*

Figure 16:
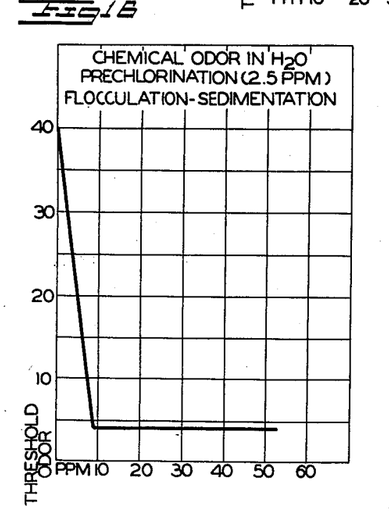

The results of this example are graphically illustrated in FIGURE 16 of the drawings. The raw water treated and the method of treatment was identical with that of Example VI. The treating agent employed, however, was one identical with that of Example XIII. As shown in FIGURE 16, the addition of approximately 9 p.p.m. of the treating agent reduced the threshold odor to approximately 4. The addition of additional amounts of treating agent up to 50 p.p.m. did not contribute or remove odor from the samples.

*Example XVII*

Figure 17:
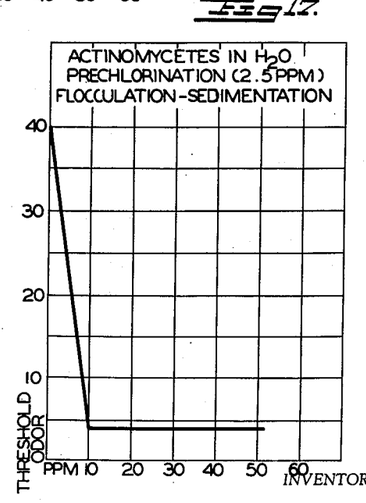

The results of this example are graphically illustrated in FIGURE 17 of the drawings. The raw water treated and the method of treatment was identical with that of Example IX. The treating agent employed, however, was the treating agent of Example XIII. As shown in FIGURE 17, the addition of 10 p.p.m. of this treating agent reduced the threshold odor to approximately 4. Additional amounts of treating agent up to 50 p.p.m. did not contribute or remove odor from the samples.

*Example XVIII*

Four parts by weight of calcium hydroxide and 21 parts by weight of alfalfa leaf meal were intimately admixed and added to sufficient water (distilled) at room temperature to obtain a pH of 11.5. After allowing several minutes for activation during which agitation was employed, the insoluble material was allowed to settle. The supernatant solution was decanted and then centrifuged.

A ribbon of standard laboratory filter paper of 40 cm. length was suspended above the centrifuged supernate with the lower end of the ribbon immersed therein. Water vapor was continuously atomized onto the filter strip. Supernate gradually moved up the strip by capillary action. After supernate had moved up the strip 20 cm., the strip was viewed in ultra-violet light. Five areas or zones of different intensity of fluorescence were observed. The following tabulated data compares the odor reducing properties of each of these zones, zone number 1 being at the top of the filter paper and successive zones in a direction towards the immersed end being numbered 2 through 5 respectively.

| Zone No. | Length of Zone, cm. | Fluorescent Intensity Rating [1] | Odor Reducing Rating [1] |
|---|---|---|---|
| 1 | 3 | 3 | 3 |
| 2 | 5 | 2 | 2 |
| 3 | 4 | 1 | 1 |
| 4 | 2 | 4 | 4 |
| 5 | 6 | 5 | 5 |

[1] *Ratings.*—1 indicates maximum fluorescent intensity rating or maximum odor reducing rating while 5 indicates a minimum rating.

From the above, it is apparent that maximum odor reducing properties are obtained by the concentrate adsorbed in the central or middle zone of the chromatograph.

*Example XIX*

Supernate prepared in the manner as described in Example XVIII was employed for a further chromatographic analysis. In this experiment, a glass column of 4 mm. diameter was packed with a commercially available compound known as "Hyflosupercell" and the lower end of the column was immersed in the supernate. The liquid slowly ascended in the column. In this case, three segments or zones of different color intensity were observed in natural light. Fluorescent intensity could not be used since the glass of the column would not transmit ultra-violet light. The top segment was brown followed by orange, the middle segment or central zone was brown followed by the green, and the lower segment was orange followed by yellow green. The central zone or middle segment had the greatest efficiency in reducing the odor of a standard test water having a threshold odor of 40.

*Example XX*

For the purpose of demonstrating that the leguminous group of plants contain materials which may be activated and used in the process of the invention to effect a reduction of taste and odors in water, additional representatives of this group were tested under laboratory conditions. Specifically, the additional forms of leguminous plants investigated were hairy vetch, common vetch, and button winter clover. The dehydration procedure used on these legumes was the same as described for proper dehydration of alfalfa and after dehydration the leaves were pulverized into a fine meal. In each instance, quantities of leguminous leaf meal were used in proportions of 80 percent by weight dehydrated leaf meal to 20 percent by weight of calcium hydroxide in making up the dry mix.

To test the efficiency of these leguminous dry mixes, measured quantities of the total dry product mixed in the above proportions were used in tests on prechlorinated odor and taste bearing waters in accordance with the process of the invention, yielding the following results:

TOTAL PRODUCT

| Raw Water Threshold Odor Value | Hairy Vetch | | Common Vetch | | Winter Clover | |
|---|---|---|---|---|---|---|
| | P.p.m. | Odor value reduced to— | P.p.m. | Odor value reduced to— | P.p.m. | Odor value reduced to— |
| 40 | 10 | 10 | 10 | 12 | 10 | 12 |
| 20 | 10 | 4 | 10 | 5 | 10 | 5 |

It is evident that the foregoing dehydrated leguminous plants when properly activated have odor reducing activities, although they are not as effective as activated alfalfa leaf meal.

*Example XXI*

Supernate samples were prepared from hairy vetch, common vetch and button winter clover in the following manner: Dehydrated meal obtained as described in Example XX from each leguminous plant was dry-mixed with calcium hydroxide in proportions of 8 parts meal by weight to 2 parts by weight of calcium hydroxide. These dry mixes were then added to odor free water so as to produce a concentration of dry-mix product therein of from 1 to 5 percent. The dry mix was thoroughly mixed with odor free water, allowed to settle, and then the clear supernatant liquid separated from the solid matter. This supernate was tested on prechlorinated taste and odor bearing raw water under laboratory conditions and in accordance with the process of the invention. As in the preceding examples, the additions of supernate by p.p.m. in the table appearing below, is based on p.p.m. of the total dry-mix used in preparing the supernate and not on the weight of supernate itself.

SUPERNATE

| Raw Water Threshold Odor Value | Hairy Vetch | | Common Vetch | | Winter Clover | |
|---|---|---|---|---|---|---|
| | P.p.m. | Odor value reduced to— | P.p.m. | Odor value reduced to— | P.p.m. | Odor value reduced to— |
| 40 | 10 | 8 | 10 | 10 | 10 | 10 |
| 20 | 10 | 2 | 10 | 4 | 10 | 4 |

It may be observed from the above table and the table appearing in Example XX that the efficiency of supernate is greater than that shown by use of the total product. However, the supernate of all three of the above leguminous materials is inferior to activated alfalfa supernate in reducing tastes and odors.

*Example XXII*

Dehydrated alfalfa leaf meal and lime, in proportions of 2 parts lime for every 8 parts of dehydrated alfalfa leaf meal, were mixed with odor-free water in proportions of 10 grams of the lime and alfalfa mixture to 200 milliliters of water. After agitation, the supernate was separated from solids and then dehydrated under partial vacuum so as to boil at 60° C. A yield of 1.14 grams of dry powder was obtained as residue, representing the active products derived from 10 grams of the alfalfa-lime mixture. This dry powder was placed in odorless water so as to yield a solution equivalent to a known quantity of the dry alfalfa-lime mix in water. When this solution was used in accordance with the process of the invention in treating prechlorinated raw water having an initial threshold odor value of 100, the following results were obtained.

A quantity of solution equivalent to 15 p.p.m. of the dry-mix reduced the odor value to 8.
A quantity of solution equivalent to 17 p.p.m. of the dry-mix reduced the odor value to 5.
A quantity of solution equivalent to 20 p.p.m. of the dry-mix reduced the odor value to 3.

It is apparent from the above results that the active components of the supernate retain their activity after dehydration under the above conditions.

*Example XXIII*

Another method of producing a dehydrated concentrate may be described in the following fashion: Supernate was prepared from alfalfa leaf meal-lime mix as described in Example XXII and then acidified to a pH of 1.0 with sulphuric acid. A heavy precipitate was formed which was separated from the liquid and the precipitate was then dehydrated under partial vacuum at 60° C. The yield of dehydrated concentrate by this method from 10 grams of dry-mix was 2.6 grams. The concentrate thus obtained was soluble in water and effective in reducing tastes and odors. Quantities of this concentrate, in p.p.m. based upon the original dry-mix product used in producing the concentrate, were used as in Example XXII in treating prechlorinated raw water having an initial threshold odor value of 100. The following results were obtained:

A quantity of solution equivalent to 15 p.p.m. of the dry-mix reduced the odor value to 8.
A quantity of solution equivalent to 17 p.p.m. of the dry-mix reduced the odor value to 4.
A quantity of solution equivalent to 20 p.p.m. of the dry-mix reduced the odor value to 2.

It is apparent from the above results that the activity of equivalent quantities of the above prepared concentrate, based upon the original dry-mix used in its preparation, is greater than in the concentrate prepared by Example XXII.

*Example XXIV*

Samples of concentrates from dehydrated hairy vetch, common vetch and button winter clover were prepared in the manner as described for alfalfa in Example XXIII. The dehydrated concentrates of each of these legumes was tested as in Example XXII using raw water having an initial threshold odor value of 100. In each instance, p.p.m. in the table below is based upon the p.p.m., dry-mix used in preparing the concentrate and not on the actual weight of the concentrate.

| Raw Water Threshold Odor Value | Hairy Vetch | | Common Vetch | | Winter Clover | |
|---|---|---|---|---|---|---|
| | P.p.m. | Odor value reduced to— | P.p.m. | Odor value reduced to— | P.p.m. | Odor value reduced to— |
| 100 | 20 | 8 | 20 | 10 | 20 | 10 |
| 100 | 17 | 10 | 17 | 12 | 17 | 12 |
| 100 | 15 | 12 | 17 | 14 | 17 | 15 |

It is apparent from the foregoing example that the dehydrated concentrates prepared from various leguminous plants are effective in reducing tastes and odors. However, none is as efficient as alfalfa, as shown by Example XXIII.

*Example XXV*

Supernate was prepared from alfalfa-lime mix as described in Example XVIII and then placed in an oven maintained at 100° C. The liquid was permitted to evaporate, leaving behind a solid concentrate which contained the active component or components of the activated mix. The use of quantities of this concentrate equivalent to 8 p.p.m. of the dry-mix from which it was prepared, reduced threshold odors in raw water from 25 to 1.

It is apparent from the foregoing that elevated temperatures (up to 100° C.) may be used in preparing dehydrated concentrates from the supernate without appreciably reducing the odor and taste activities of the dehydrated concentrates thus produced.

*Example XXVI*

100 milliliter solutions of the following metal chelates were prepared as follows.

Chelate No. 1:
    Sodium nitrate___________________________gm__ 1.0
    Tricarboxy trimethylamine_______________gm__ 1.9
    Water ___________________________________ml__ 80
    Caustic soda_____________________________gm__ .5
    Ferrous chloride_________________________gm__ 1.8
    Make up to 100 ml. total volume of solution.

Chelate No. 2:
  Glycolic acid 70% __________________ gm __ 2.2
  Triethanol amine __________________ gm __ 1.5
  Water ______________________________ ml __ 80
  Ferrous chloride __________________ gm __ 1.8
  Adjust pH to 6.5 and make up to 100 ml. of solution.
Chelate No. 3:
  Ethylene diamine tetraacetic acid tetrasodium salt ___________________________ gm __ 4.2
  Water ______________________________ ml __ 80
  10% HCl ____________________________ ml __ 3
  Cobaltous chloride ________________ gm __ 2.1
  Make up to 100 ml. total volume of solution.
Chelate No. 4:
  Ethylene diamine tetraacetic acid tetrasodium salt ___________________________ gm __ 4.2
  10% HCl ____________________________ ml __ 3
  Manganese chloride ________________ gm __ 1.8
  Make up to 100 ml. total volume of solution.
Chelate No. 5:
  Ethylene diamine __________________ ml __ 1.5
  Sodium gluconate __________________ gm __ 1.5
  $FeSO_4 \cdot 7H_2O$ ______________ gm __ 1.0
  Make up to 100 ml. total volume of solution.

The effectiveness of the above prepared metal chelate solutions was tested under laboratory conditions following the procedure outlined below.

LABORATORY TEST PROCEDURE

A multiple speed stirring machine equipped with six three liter battery jars was used in running the laboratory tests. The battery jars were filled with raw water and the raw water treated with sodium hypochlorite in amounts equal to 3.3 p.p.m. of available chlorine. Immediately following the chlorine treatment, the water treating agent to be tested was added to the various jars with one jar being reserved as a control and not receiving any treating agent. The reaction was allowed to proceed for thirty minutes with high speed agitation, and at the end of this time two grains per gallon of alum was added followed by sufficient lime to give a pH of about 7 in the finished water. Following the addition of alum and lime, high speed agitation was continued for 3 minutes followed by agitation at low speed for fifteen minutes. After this period of time the stirrers were raised to just touch the surface of the water and were allowed to run at low speed until coagulation was complete. The clarified water was then decanted and filtered through a sand filter and tested for odor. Odor tests were made at a temperature of 65° C. and in accordance with the procedure given on pages 16 through 19 of "Standard Methods for the Examination of Water and Sewage," 9th edition, 1946.

The following results were obtained from the above tests:

| P.p.m. of Chelate Solutions | Threshold Odor Value | | |
|---|---|---|---|
| | Raw Water | Control | Finished Water |
| 10 p.p.m. Chelate No. 1 Solution | 16 | 5 | 2 |
| 20 p.p.m. Chelate No. 2 Solution | 16 | 5 | 2.5 |
| 20 p.p.m. Chelate No. 3 Solution | 16 | 5 | 3 |
| 20 p.p.m. Chelate No. 4 Solution | 16 | 5 | 3 |
| 6 p.p.m. Chelate No. 5 Solution | 25 | 10 | 4 |

The foregoing tests clearly establish the effectiveness of metal chelates as treating agents in reducing tastes and odors in raw water, when used in accordance with the process of the invention.

*Example XXVII*

Ferrous chelates of phenanthroline, ethylene diamine, salicyclic acid, and gluconic acid were prepared and tested under laboratory conditions in a manner corresponding to Example XXVI. The experimental data thus obtained are recorded in the table below:

| Ferrous Chelate of— | P.p.m. | Threshold Odor of Raw Water | Control | Threshold Odor Reduced to— |
|---|---|---|---|---|
| Phenanthroline | 3.75 | 30 | 10 | 7 |
| Ethylene diamine | 3.75 | 25 | 10 | 6 |
| Salicylic Acid | 2.5 | 25 | 10 | 6 |
| Gluconic Acid | 0.75 | 25 | 10 | 6 |

It is apparent from the foregoing that a variety of different types of ferrous chelates are effective in reducing tastes and odors initially present in water supplies.

*Example XXVIII*

Metal chelates may be formed in situ by the addition of the chelating agent to a natural water normally containing traces of metal ions such as iron and copper.

A number of different types of chelating agents were tested under the test conditions of Example XXVI. In each instance the chelating agent was added directly to the prechlorinated raw water. Experimental data thus obtained are tabulated below:

| Chelating Agent | Threshold Odor Value | | | |
|---|---|---|---|---|
| | P.p.m. | Raw Water | Control | Finished Water |
| Ethylene diamine | 5.0 | 30 | 10 | 4 |
| Salicylic Acid | 0.4 | 25 | 10 | 7 |
| Chrome Black PV [1] | 1.0 | 25 | 10 | 7 |
| Phthalic Acid | .5 | 35 | 12.5 | 10 |
| Do | 1.3 | 12.5 | 5.5 | 2.0 |
| Potassium hydrogen Saccharate | 1.2 | 22 | 9 | 6 |
| Alizarine SS [2] | .5 | 14 | 4 | 3 |
| Ascorbic Acid | .5 | 14 | 4 | 3 |
| Carboxy Methyl Mercapto Succinic Acid | .5 | 8 | 4 | 2 |
| Ethylene diamine tetraacetic Acid | 1.5 | 45 | 30 | 16 |

[1] Dihydroxy naphthalene (#170 in the Color Index of the Society of Dyers and Colorists—British).
[2] Trihydroxy anthraquinone (#1040 in the Color Index of the Society of Dyers and Colorists—British).

It is apparent from the foregoing that a variety of different types of chelating agents are effective in reducing tastes and odors when added directly to a natural water containing traces of desirable metal ions.

*Example XXIX*

Raw water samples were first prechlorinated and then treated with either sodium salicylate or phthalate. Thereafter the water thus treated was subjected to flocculation, sedimentation and filtration in the manner of Example XXVI. Odor tests were then made yielding the following data:

| Treating Agent | Threshold Odor Value | | | |
|---|---|---|---|---|
| | P.p.m. | Raw Water | Control | Finished Water |
| Sodium Salicylate | 0.4 | 25 | 10 | 6 |
| Sodium phthalate | 1.3 | 12.5 | 5.5 | 2.0 |

It will be noted from the foregoing that salts of polycarboxylic acids such as the phthalates, or salts of hydroxy acids such as the salicylates, are effective as water treating agents.

*Example XXX*

Raw water samples having threshold odors varying from 200 to 25 were first prechlorinated and then treated with from 3 to .25 p.p.m. of 2,3-dichloro-1,4-naphthoquinone. The 2,3-dichloro-1,4-naphthoquinone was dissolved in distilled water that had been brought to a pH of 11.8 by the addition of sodium hydroxide. This solution was then added to the prechlorinated raw water. Thereafter the water thus treated was subjected to flocculation with alum and lime, sedimentation, and filtration in the manner of Example XXVI. Odor tests were then made, yielding the following results:

| Threshold Odor of Raw Water | 2,3-dichloro-1,4-naphthoquinone (dry), p.p.m. | Threshold Odor of Water Reduced to— |
|---|---|---|
| 200 | 3 | 2 |
| 100 | 2 | 1.5 |
| 50 | .5 | 1 |
| 40 | .4 | 1 |
| 25 | .25 | 1 |

It will be observed from the above tabulated results that 2,3-dichloro-1,4-naphthoquinone, a "carrier for oxygen," is a very effective compound for removing taste and odors from water.

Example XXXI

A glass was made up from a mixture of 40 parts sodium hexametaphosphate and 1.5 parts $Fe_2O_3$. This glass was ground to a fine powder and then blended with sodium gluconate, bentonite and Columbia filler clay in the following proportions to produce a water treating product in a dry form.

|  | Gm. |
|---|---|
| $(NaPO_3)_6/Fe_2O_3$ glass | 8.6 |
| Sodium gluconate | 0.15 |
| Bentonite | 32.25 |
| Clay (Columbia filler) | 45.00 |
|  | 86.00 |

Glass—10% of product.
$Fe_2O_3$—0.375% of product.

The above water treating product was tested using the procedure of Example XXVI on an odor bearing water (woody) taken from the Guadeloupe River near Seadrift, Texas. The raw water had a threshold odor value of 20. The threshold odor value was reduced to 8 in the control, but with 4 p.p.m. of the above product the odor was reduced to 4. The product was also compared with a high grade activated carbon. Addition of 8 p.p.m. of this carbon gave a threshold odor value of 8, thus showing no reduction over the control.

A second water treating product was prepared which was identical to the above except that the glass was made up of 40 parts sodium hexametaphosphate, 1.1 parts $Fe_2O_3$, and 0.4 parts $MnO_2$. This product was equally as effective as the foregoing product.

Example XXXII

The iron chelate of ethylenediamine tetraacetic acid (EDTA) was prepared by dissolving 6.00 gm. EDTA in 20 ml. water containing 2.75 gm. NaOH, and then adding 6.00 gm. $FeSO_4 \cdot 7H_2O$ to this solution. The chelate solution thus prepared was then blended with 120 gm. Columbia filler clay, 106 gm. bentonite, 5 gm. $(NaPO_3)_6$ and 5 gm. sodium gluconate. The resulting water treating product contained 0.45% complexed iron and was dry and free flowing.

A water treating product using the copper chelate of EDTA was also prepared in the foregoing manner by substituting an equivalent quantity of the copper salt for the $FeSO_4 \cdot 7H_2O$, and another product using a chelate of mixed metals (equal quantities of Fe, Mn, Cu, Co, with the total metal being equivalent to the amount of iron in the above prepared iron chelate).

These three water treating products were used in treating a raw water having a threshold odor value of 45. A chlorine residual run on this water before testing showed the break point required about 20 p.p.m. chlorine. In prechlorinating the raw water a chlorine addition of 6.6 p.p.m. was selected. The treating agent was then added, followed by flocculation, sedimentation, and filtration. The finished water was tested in the usual manner for taste and odor, the results appearing below:

| Metal Chelate of EDTA | Threshold Odor | | |
|---|---|---|---|
|  | Raw Water | Control | Finished Water |
| 9 p.p.m. iron chelate product | 45 | 11 | 3 |
| 9 p.p.m. copper chelate product | 45 | 11 | 3 |
| 9 p.p.m. mixed metal (Fe, Cu, Mn, Co) chelate | 45 | 11 | 4 |

This experiment shows the iron and copper chelates to be equally effective in reducing odors in water. A mixture of metal chelates is also effective but not as effective as either the iron or copper chelate.

The quantity of active treating agent (chelate) required to reduce threshold odor values from 45 to 3 is shown to be very small. For example, only 9 p.p.m. of the water treating product containing 0.45% chelated metal was added in the above experiment.

Example XXXIII

The following experiment was conducted for the purpose of determining the effect of chlorine residual on the effectiveness of the water treating product containing iron chelate of EDTA which was prepared in Example XXXII.

A raw water having a sweetish, earthy odor and a threshold odor value of 25 was used in this test. This water had a break point with about 3.25 p.p.m. chlorine. The chlorine feed was varied from 0.8 p.p.m. to 5.0 p.p.m. and the addition of water treating product was held constant at 6 p.p.m. Experimental conditions were otherwise the same as in Example XXXII. The following results were obtained:

| Chlorine Feed, p.p.m. | Chlorine Residual | Water Treating Product Feed, p.p.m. | Threshold Odor | | |
|---|---|---|---|---|---|
|  |  |  | Raw Water | Control | Finished Water |
| 0.8 | .05 | 6 | 25 | 8 | 7 |
| 1.6 | .10 | 6 | 25 | 8 | 4 |
| 3.3 | .05 | 6 | 25 | 8 | 2 |
| 5.0 | .20 | 6 | 25 | 8 | 3 |

This experiment shows the water treating product to be most effective when the chlorine feed is at or near the break point. The product decreases in effectiveness on either side of the break point.

Example XXXIV

A distilled water was aerated for 24 hours and until the oxygen content was 9.5 p.p.m. Then synthetic odor water was added to bring the threshold odor value up to 25. The various treating agents were then added to the water without prechlorination or further treatment and allowed to react with the water for 24 hours. Finally, 48 p.p.m. alum, 17 p.p.m. hydrated lime and 10 p.p.m. bentonite was added, the water stirred rapidly for 30 minutes, and allowed to settle. The following results were obtained.

| Water Treating Agent | Threshold Odor Value | | |
|---|---|---|---|
|  | Raw Water | Control | Finished Water |
| 7.5 p.p.m. iron chelate of Example XXXII | 25 | 4 | 4 |
| 0.25 p.p.m. 2,3-dichloro-1,4-naphthoquinone | 25 | 4 | 5 |
| 0.5 p.p.m. phthalic acid | 25 | 4 | 4 |

This experiment shows it is usually desirable to prechlorinate the raw water before addition of treating agent.

I claim:

1. A process for treating water having objectionable tastes and odors initially present comprising reducing tastes and odors initially present in the water to an acceptable threshold value by chlorinating the water and treating the water in the presence of chlorine with small but effective quantities of a preformed transitional metal chelate of a molecularly dehydrated phosphate, the transitional metal being selected from the group consisting of iron, cobalt, nickel, manganese and copper.

2. The process of claim 1 wherein the water is post-chlorinated subsequent to treatment with the preformed transitional metal chelate.

3. The process of claim 1 wherein the transitional metal is iron.

4. The process of claim 1 wherein the water is chlorinated with about 1–10 p.p.m. of chlorine and about 0.2–3.75 p.p.m. of the preformed transitional metal chelate is admixed in the water in the presence of the chlorine.

5. A process for treating water having objectionable tastes and odors initially present comprising reducing tastes and odors initially present in the water to an acceptable threshold value by: prechlorinating the water, thereafter treating the water in the presence of chlorine with small but effective quantities of at least one preformed transitional metal chelate, and then post-chlorinating the water.

6. The process of claim 5 wherein the water is pre-chlorinated with about 1–10 p.p.m. of chlorine, and about 0.2–3.75 p.p.m. of the preformed transitional metal chelate is admixed in the water in the presence of the chlorine.

7. A process for treating water having objectionable tastes and odors initially present comprising reducing tastes and odors initially present in the water to an acceptable threshold value by: prechlorinating the water, thereafter treating the water in the presence of chlorine with small but effective quantities of at least one preformed iron chelate, and then post-chlorinating the water.

8. The process of claim 7 wherein the water is pre-chlorinated with about 1–10 p.p.m. of chlorine, and about 0.2–3.75 p.p.m. of the preformed iron chelate is admixed in the water in the presence of the chlorine.

9. A process for treating water having objectionable tastes and odors initially present comprising reducing tastes and odors initially present in the water to an acceptable threshold value by: prechlorinating the water, thereafter treating the water in the presence of chlorine with small but effective quantities of at least one preformed transitional metal chelate of a transitional metal selected from the group consisting of iron, cobalt, nickel, manganese and copper and a chelating agent selected from the group consisting of aromatic diamine chelating agents, aliphatic diamine chelating agents, polycarboxylic acid chelating agents, amino acid chelating agents, organic hydroxy acid chelating agents, dihydroxy azo dye chelating agents, beta-diketone chelating agents, molecularly dehydrated phosphate chelating agents, and then post-chlorinating the water.

10. The process of claim 9 wherein the water is pre-chlorinated with about 1–10 p.p.m. of chlorine, and about 0.2–3.75 p.p.m. of the preformed transitional metal chelate is admixed in the water in the presence of the chlorine.

11. A process for treating water having objectionable tastes and odors initially present comprising reducing tastes and odors initially present in the water to an acceptable threshold value by: prechlorinating the water, thereafter treating the water in the presence of chlorine with small but effective quantities of a preformed transitional metal chelate of ethylenediamine tetraacetic acid, the transitional metal being selected from the group consisting of iron, cobalt, nickel, manganese and copper, and then post-chlorinating the water.

12. The process of claim 11 wherein the water is pre-chlorinated with about 1–10 p.p.m. of chlorine, and about 0.2–3.75 p.p.m. of the preformed transitional metal chelate is admixed in the water in the presence of the chlorine.

13. A process for treating water having objectionable tastes and odors initially present comprising reducing tastes and odors initially present in the water to an acceptable threshold value by: prechlorinating the water, treating the water in the presence of chlorine with small but effective quantities of a first portion of a treating agent comprising at least one preformed transitional metal chelate of a transitional metal selected from the group consisting of iron, cobalt, nickel, manganese and copper and a chelating agent selected from the group consisting of aromatic diamine chelating agents, aliphatic diamine chelating agents, polycarboxylic acid chelating agents, amino acid chelating agents, organic hydroxy acid chelating agents, dihydroxy azo dye chelating agents, beta-diketon chelating agents and molecularly dehydrated phosphate chelating agents, thereafter treating the water with small but effective quantities of at least one additional portion of said treating agent, and then post-chlorinating the water.

14. The process of claim 13 wherein the water is pre-chlorinated with about 1–10 p.p.m. of chlorine, about 0.2–3.75 p.p.m. of the preformed transitional metal chelate is admixed in the water in the presence of the chlorine, and the water is post-chlorinated with about 1–10 p.p.m. of chlorine.

15. A process for treating water having objectionable tastes and odors initially present comprising reducing tastes and odors initially present in the water to an acceptable threshold value by: prechlorinating the water, treating the water in the presence of chlorine with small but effective quantities of a first portion of a treating agent comprising a preformed transitional metal chelate of ethylenediamine tetraacetic acid, the transitional metal being selected from the group consisting of iron, cobalt, nickel, manganese and copper, thereafter treating the water with small but effective quantities of at least one additional portion of said treating agent, and then post-chlorinating the water.

16. The process of claim 15 wherein the water is prechlorinated with about 1–10 p.p.m. of chlorine, about 0.2–3.75 p.p.m. of the preformed transitional metal chelate is admixed in the water in the presence of the chlorine, and the water is post-chlorinated with about 1–10 p.p.m. of chlorine.

References Cited in the file of this patent

UNITED STATES PATENTS

| 173,607 | Fehr | Feb. 15, 1876 |
| 1,648,259 | Caldwell | Nov. 8, 1927 |
| 1,903,889 | Adler | Apr. 18, 1933 |

OTHER REFERENCES

Goodyear et al.: "Uses of Chelating and Sequestering Agents in Cosmetics," 5. J. Soc. Cosmetic Chemists, pp. 96–103 (1954).

Lesser: "Chlorophyll as a Deodorant," 68 Drug and Cosmetic Ind. 39 (1951).

Wescott: "New Body and Breath Deodorant," 56 Am. Perfumer and Essential Oil Review 285–288 (1950).

Willstatter: "Chlorophyll," 37 J. Am. Chem. Soc. 324–325, 332–333, 339–341 (1915).

"Sequestrene," Alrose Chemical Co., Providence, R.I., pp. 16–18, 22–25 and 50, 7/25/52.

"The Tetrines," Glyco Products Co. Inc., Brooklyn 1, N.Y., pp. 9–11, Sept. 1953.